United States Patent [19]

Jennings

[11] Patent Number: 4,458,587
[45] Date of Patent: Jul. 10, 1984

[54] ADJUSTABLE BALE KICKER

[75] Inventor: Richard E. Jennings, New Holland, Pa.

[73] Assignee: Sperry Corporation, New Holland, Pa.

[21] Appl. No.: 353,269

[22] Filed: Mar. 1, 1982

[51] Int. Cl.³ .............................................. B30B 5/04
[52] U.S. Cl. ........................................ 100/88; 56/341
[58] Field of Search .................... 56/341, 343; 100/88; 248/295.1, 297.3; 267/177

[56] References Cited

U.S. PATENT DOCUMENTS 1,808,647 6/1931 Fazekas ........................ 248/295.1 X
4,206,587 6/1980 Freimuth et al. ..................... 56/341

FOREIGN PATENT DOCUMENTS 52-47701 1/1977 Japan .................................. 248/297.3

OTHER PUBLICATIONS

Sperry New Holland Assembly Information, Round Baler, 846–847, (Bale Ejector).

Primary Examiner—Philip R. Coe
Assistant Examiner—Frankie L. Stinson
Attorney, Agent, or Firm—Darrell F. Marquette; Frank A. Seemar; Larry W. Miller

[57] ABSTRACT

An improved bale kicker is provided for use on roll baling machines to propel bales rearwardly of the machine upon discharge therefrom. The bale kicker may be easily adjusted in the field, without using tools, to kick bales of different weight.

2 Claims, 4 Drawing Figures

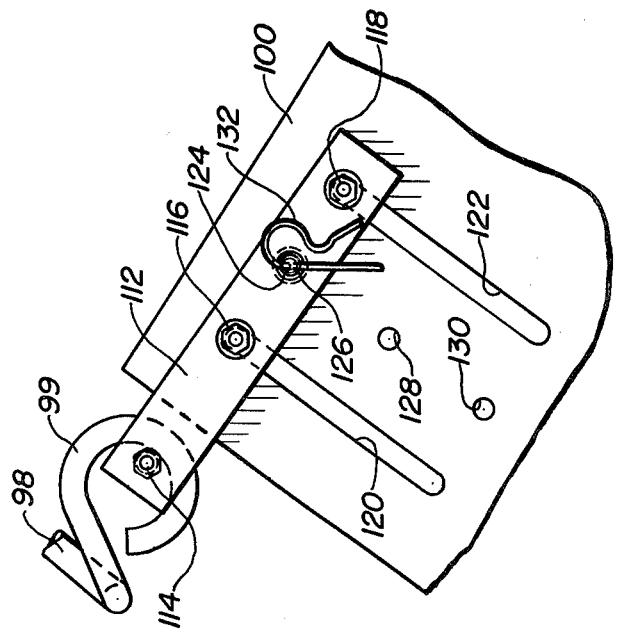
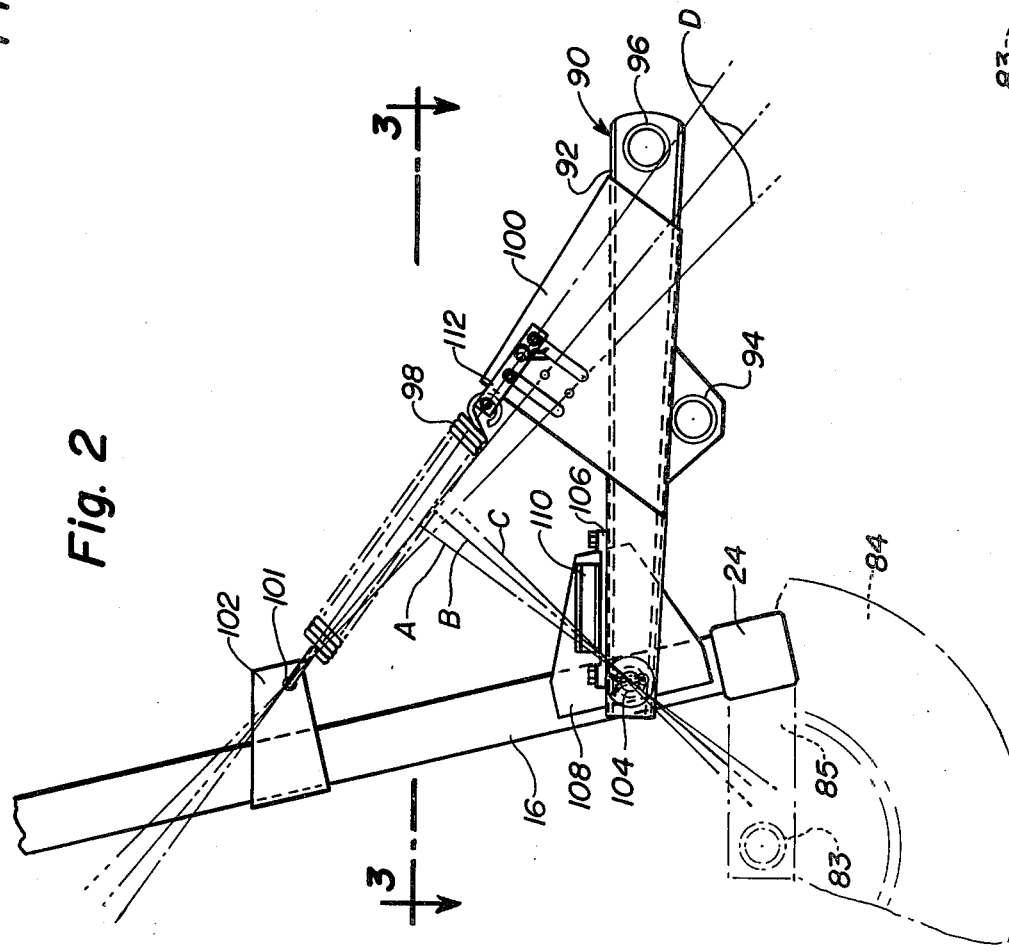
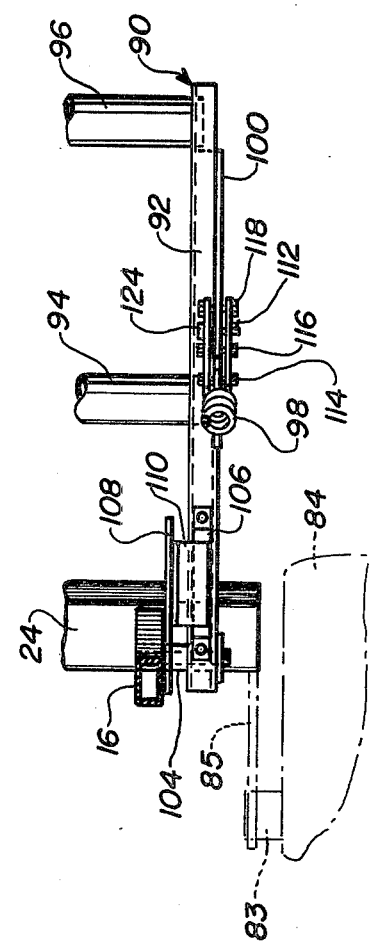

ADJUSTABLE BALE KICKER

BACKGROUND OF THE INVENTION

This invention relates generally to roll baling machines typically referred to as "round balers" which form cylindrical roll bales of crop material.

Bale kickers have been used on roll baling machines to propel bales rearwardly of the machine. U.S. Pat. No. 4,206,587 shows several bale kickers that are pivotable between raised and lowered positions and biased by springs toward the raised position. A drawback of these bale kickers is that the loading on the springs must be changed, by using tools such as wrenches, in order to adjust the bale kickers for bales of different weight.

SUMMARY OF THE INVENTION

The present invention is intended to use on roll baling machines having a frame, and bale forming means supported on the frame for forming roll bales of crop material. Specifically, the present invention provides bale kicker means pivotally connected to the frame for contacting a roll bale upon its discharge from the frame and propelling it rearwardly of the frame. The bale kicker means is pivotally movable between a raised position and a lowered position during discharge of a roll bale from the frame. The bale kicker means includes spring means connected to the frame normally urging the bale kicker means toward the raised position. The bale kicker means is adjustable for roll bales of different weight without substantially changing the orientation of the bale kicker means relative to the frame when the bale kicker means is in the raised position and without substantially changing the loading on the spring means. The preferred embodiment of the bale kicker means includes bar members pivotally connected to the frame, and the spring means comprises extension springs connected to the bar members at a plurality of locations in order to adjust the bale kicker means for bales of different weight.

DESCRIPTION OF THE DRAWINGS

FIG. 2 is an enlarged view of a portion of the roll baling machine of FIG. 1 showing the bale kicker;

FIG. 3 is a section view taken along lines 3-3 in FIG. 2; and

FIG. 4 is a further enlarged view of part of the bale kicker shown in FIGS. 1 and 2.

DESCRIPTION OF THE PREFERRED EMBODIMENT

Figure 1:
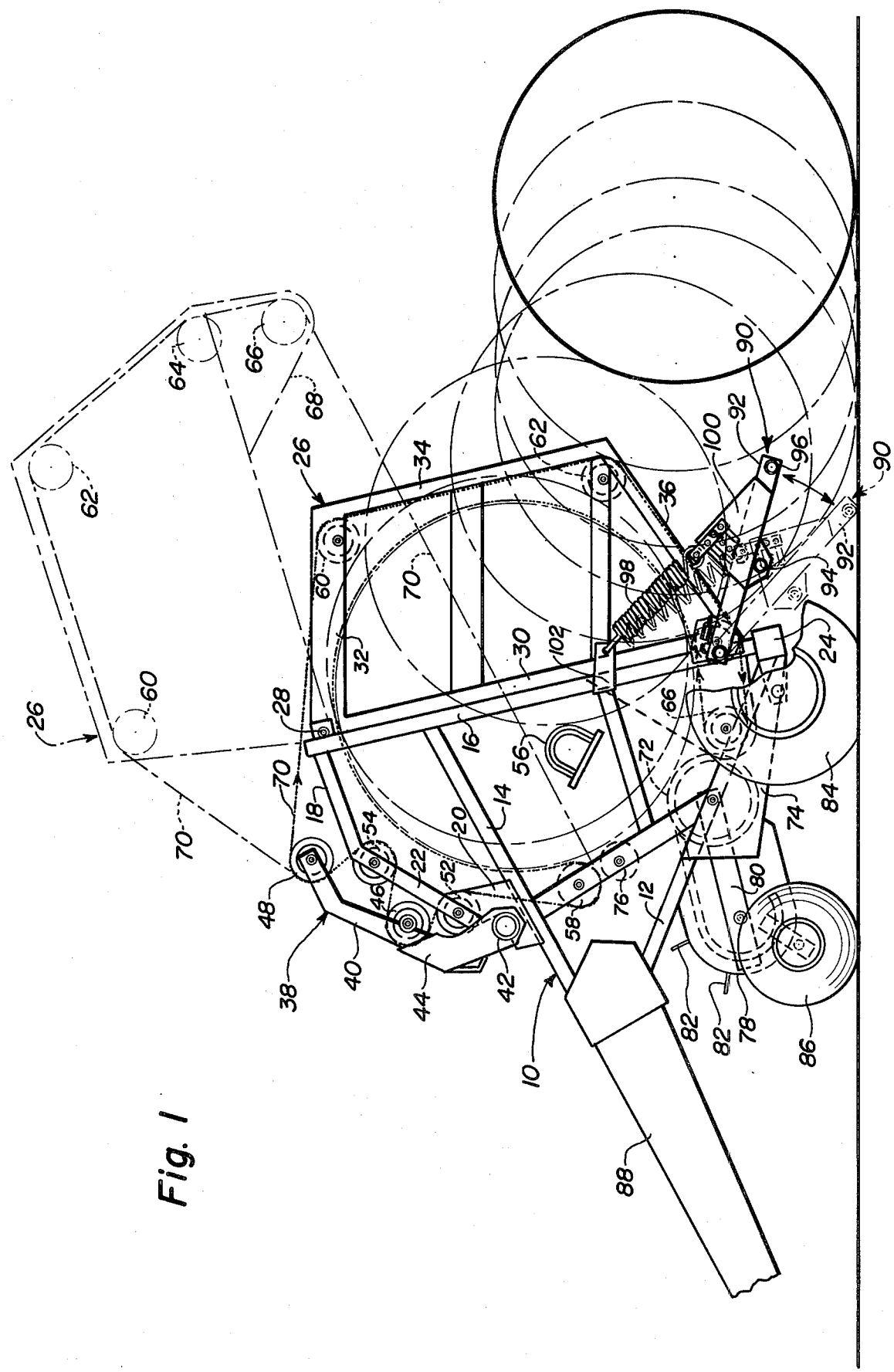
FIG. 1 is a side elevation view of a roll baling machine embodying the preferred embodiment of the bale kicker of the present invention.

Referring to FIG. 1, the roll baling machine embodying the preferred embodiment of the present invention includes a base frame 10 having opposite sides each formed generally of frame members 12,14,16 rigidly connected in a triangular configuration with side plates substantially covering the space therebetween. Each side of the base frame 10 includes an upper section, which consists of a frame member 18 rigidly connected to the frame member 16, a bracket 20 rigidly connected to frame member 14, and a frame member 22 rigidly connected between the frame member 18 and the bracket 20. A plate is connected to and covers the space between the frame members 14,16,18 and 22. A frame member 24 extends transversely of the machine and is rigidly connected to the frame members 16. A rear frame 26 is pivotally connected at 28 to the base frame 10 by suitable bearings. The rear frame 26 has opposite sides each formed generally of frame members 30,32,34,36 rigidly connected in a substantially trapezoidal configuration with side plates substantially covering the space therebetween. Other frame members (not shown) extend transversely of the machine and connect the opposite sides of the base frame 10 and the opposite sides of the rear frame 26. In FIG. 1, the forward end of the machine is to the left and the rearward end thereof is to the right.

The rear frame 26 is pivotally movable from the lower position shown in full lines in FIG. 1 to an upper position shown in phantom lines in FIG. 1 by conventional means such as hydraulic cylinders (not shown) mounted at the sides of the machine and connected between the base frame 10 and the rear frame 26.

An arm assembly 38 is rotatably mounted on the base frame 10 for rotational movement between a forward position (not shown) and a rearward position shown in FIG. 1. The arm assembly 38 includes arms 40 disposed inboard the sides of the machine. The arms 40 are rigidly connected to a cross tube 42 by bracket members 44. The cross tube 42 is rotatably mounted in suitable bearing members carried by the brackets 20 on the opposite sides of the base frame 10. The arm assembly 38 is normally urged toward its forward position preferably by conventional means such as extension or compression springs (not shown) connected between the arm assembly 38 and the base frame 10.

The arm assembly 38 carries rotatable guide members 46 and 48 on its arms 40. The base frame 10 supports rotatable guide members 52,54 and cam guide members 56 inboard its opposite sides. Preferably, the cam guide members 56 are of the known type disclosed in U.S. Pat. No. 3,901,007 and designated therein by the numeral "118". Sprockets 58 are provided inboard the opposite sides of the base frame 10 and are fixed on a shaft that is rotatably mounted in suitable bearings on the base frame 10. The rear frame 26 supports rotatable guide members 60,62,64,66 inboard its opposite sides. The guide members 66 are carried on brackets 68 projecting from the frame members 30 of the rear frame 26.

A flexible bale forming apron 70 is movably supported on the aforementioned guide members and sprockets. The apron 70 is preferably formed of a pair of endless link-type chains connected at spaced intervals by transverse bars or slats. The apron chains 70 extend around and engage the various guide members and the sprockets 58. This apron 70 may be of the known type disclosed in U.S. Pat. No. 3,901,007 and designated therein by the numeral "82".

A floor roller 72 extends transversely of the machine and is rotatably supported by brackets 74 on the opposite sides of the base frame 10. Preferably, the floor roller 72 consists of a hollow metal drum with a coating or layer of rubber on its outer surface. When the machine is empty, the upper surface of the floor roller 72 cooperates with a course of the apron 70 that extends upwardly and rearwardly from the guide members 66 over the cam guide members 56 and then downwardly and forwardly to the sprockets 58 to define an expandable bale chamber having an initial wedge shape (not shown) in side elevation. In this initial wedge shape, the forward end of the bale chamber is narrower than the rearward end thereof. A stripper roller 76, preferably rubber coated, extends transversely of the machine and is rotatably supported on the opposite sides of the base frame 10. The stripper roller 76 is positioned at the forward end of the bale chamber in close proximity to the apron 70.

A pickup header 78 extends transversely of the machine and is supported by brackets 80 on the opposite sides of the base frame 10. The pickup header 78 is preferably of conventional type having a series of projecting fingers 82 for engaging and picking up windrowed crop material. A pair of wheels 84 mounted on the opposite sides of the base frame 10 support the machine. As seen in FIGS. 2 and 3, the wheels 84 are mounted on spindles 83 which are connected to the frame member 24 by brackets 85. Another pair of wheels 86 are mounted to the brackets 80 to provide support primarily for the pickup header 78. A tongue 88 is provided on the forward end of the base frame 10 for connection to a tractor.

The machine includes drive means (not shown) adapted for connection to the power take off unit (PTO) of a tractor. Referring to FIG. 1, rotary driving power will be delivered from the tractor PTO in a known manner to cause rotation of the sprockets 58, the floor roller 72, the stripper roller 76, and the pickup header fingers 82 in the same direction. Rotation of the sprockets 58 will drive the apron chains thereby propelling the apron 70 around the various guide members in the base frame 10 and the rear frame 26 in the direction and along the path indicated. Preferably, the peripheral speed of the floor roller 72 should be equal to or slightly higher than the speed of the apron 70. This will tend to keep a roll of crop material toward the rearward end of the machine during formation.

As the machine is pulled across a field by a tractor, the pickup header fingers 82 engage, pick up and deliver windrowed crop material onto the upper surface of the rotating floor roller 72 in the bale chamber. The crop material is carried upwardly and then coiled back downwardly onto itself by the apron 70 which in its starting position moves upwardly and rearwardly from the guide members 66 over the cam guide members 56 and then downwardly and forwardly to the sprockets 58. This movement of the apron 70 in the bale chamber effectively starts the core of the roll bale. The rotating stripper roller 76 removes crop material from the apron 70 at the forward end of the bale chamber and delivers it back downwardly into the bale chamber. The roll bale increases in diameter lifting the inner course of the apron 70 that extends between the guide members 66 and the sprockets 58 off the cam guide members 56, and expanding the bale chamber from its initial wedge shape to a substantially circular shape. The expansion of the bale chamber results in expansion of the inner course of the apron 70 contacting the peripheral surface of the roll bale and movement of the apron 70 toward its final position shown in FIG. 1. This movement of the apron 70 is accomplished by rotation of the arm assembly 38 in a clockwise direction as viewed in FIG. 1, from its forward position. When the bale reaches its maximum diameter, the apron 70 will be in its final position of FIG. 1 and the arm assembly 38 will have rotated about 65° to its rearward position shown in FIG. 1. When it is desired to discharge a bale from the machine, the rear frame 26 is raised to its upper position. This stretches the inner course of the apron 70 across the space between the guide members 66 and the sprockets 58 thereby assisting the bale to exit the machine. The bale rotates in a clockwise direction as viewed in FIG. 1 as it exits the base frame 10.

A bale kicker 90 is mounted on the base frame 10 and includes bars 92 pivotally connected to the frame members 16. Tubes 94 and 96 extend transversely between and are connected to the bars 92. Extension springs 98 are connected at one end to brackets 100 which are attached to the bars 92 and at the other end of brackets 102 which are attached to the frame members 16. The bale kicker 90 is normally urged toward the raised position shown in full lines in FIG. 1 with the springs 98 in a relaxed or lightly loaded state. As a bale is discharged from the machine subsequent to moving the rear frame 26 to its upper position, the bale rolls onto the bale kicker 90 and pivots it downwardly to the lowered position shown in phantom lines in FIG. 1 against the force of the springs 98. This causes the bale kicker 90 to propel the bale rearwardly of the machine a sufficient distance to allow the rear frame 26 to be returned to its lower position without moving the machine forward. This function of the bale kicker 90 is similar to that of the bale kicker disclosed in U.S. Pat. No. 4,206,587.

The path of the bale as it exits the machine is represented by the bale positions shown in phantom lines in FIG. 1, and the final position of the bale is shown in full lines in FIG. 1.

Referring to FIGS 2,3 and 4, the preferred embodiment of the bale kicker 90 is shown in greater detail. The bars 92 are pivotally mounted on shafts 104 which are rigidly secured to the base frame members 16. Fittings 106 are bolted to the bars 92. Plates 108 are secured to the base frame members 16, and channel members 110 are attached to the plates 108. The fittings 106 engage the channel members 110 to prevent upward movement of the bale kicker 90 past the position shown in FIG. 2. The springs 98 are connected to the brackets 100 by fixtures 112 which straddle the brackets 100. The fixtures 112 include bolts 114 around which the end portions 99 of the springs 98 are engaged. The fixtures 112 also include rod members 116 and 118 extending through and slidable in slots 120 and 122, respectively, in the plates 100. A locating pin 124 extends through holes in each fixture 112 and through one of three holes 126,128,130 in each bracket 100. Each locating pin 124 is secured by a retainer clip 132.

The fixtures 112 may be disposed at three different locations on the brackets 100 corresponding to the holes 126, 128,130 in order to adjust the bale kicker 90 to kick bales of different weight. By changing the location of the fixtures 112 on the brackets 100, the length of the moment arm at which the springs 98 act on the bale kicker 90 is changed. The moment arm (shown at A,B,C in FIG. 2) is measured along a straight line extending from the axis of pivot shafts 104 to the longitudinal axis of the springs 98 (shown at D in FIG. 2) at a right angle thereto. When fixtures 112 are in the location corresponding to the bracket holes 126, the springs 98 act on the bale kicker 90 at the maximum momemt arm A. This adjusts the bale kicker 90 to kick bales of maximum weight. When the fixtures 112 are in the location corresponding to the bracket holes 130, the springs 98 act on the bale kicker 90 at the minimum moment arm C. This adjusts the bale kicker 90 to kick bales of minimum weight.

The bale kicker 90 may be easily adjusted, without using tools, to kick bales of different weight by simply removing the locating pins 124, moving the fixtures 112 to a different bracket hole location, and then reinserting the locating pins 124. Such adjustment does not change the particular orientation of the bale kicker 90 when in the raised position shown in FIG. 2. Such adjustment also does not change the loading on the springs 98 because the radial distance between the end portions 101 of the spring 98 and each of the bracket holes 126,128,130 is the same.

The bale kicker 90 of the present invention is not limited to use on the type of roll baling machine shown in FIG. 1 and, accordingly, may be used on any roll baling machine.

The following claims are intended to cover all modifications and variations of the preferred embodiment of the invention without departing from the spirit and scope of the invention.

Having thus described the invention, what is claimed is:

1. In a roll baling machine having a frame, bale forming means supported on said frame for forming roll bales of crop material, a bale kicker pivotally connected to said frame for contacting a roll bale upon its discharge from said frame and for propelling it rearwardly of said frame, said bale kicker including bar members spaced apart transversely of said frame and means extending between and connected to said bar members, said bale kicker being pivotally movable between a raised position and a lowered position during discharge of a roll bale from said frame, brackets attached to said bar members, springs connected between said frame and said brackets normally urging said bale kicker toward said raised position, the improvement comprising:

fixtures for connecting said springs to said brackets at a plurality of locations to adjust said bale kicker for bales of different weight;

each of said fixtures connected to an associated one of said springs and including a pin engaged in one of a plurality of holes formed in an associated one of said brackets, each of said fixtures also including a rod member engaged in a slot formed in an associated one of said brackets, said pin and said rod member being located along a straight line extending longitudinally of said one associated spring, and said slot extending transversely of said straight line.

2. The improvement of claim 1, wherein said springs are extended when said bale kicker is moved from said raised position to said lowered position.

* * * * *